May 23, 1944.   S. D. DOUGLAS   2,349,412
VINYL RESIN COMPOSITION
Filed Dec. 6, 1939
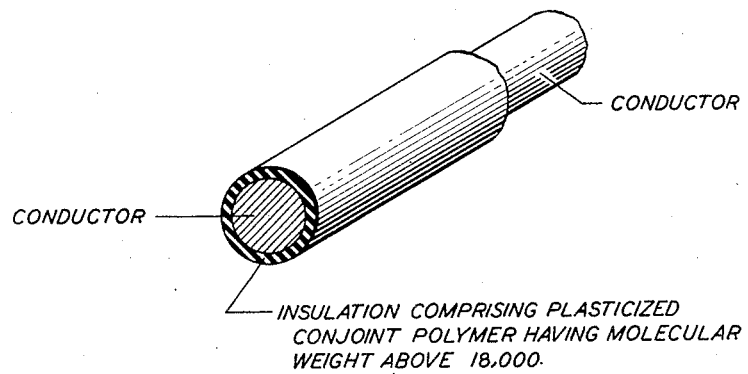
INVENTOR
STUART D. DOUGLAS
BY
ATTORNEY

Patented May 23, 1944

UNITED STATES PATENT OFFICE 2,349,412

VINYL RESIN COMPOSITION

Stuart D. Douglas, Charleston, W. Va., assignor to Carbide and Carbon Chemicals Corporation, a corporation of New York Application December 6, 1939, Serial No. 307,786

12 Claims. (Cl. 174—125)

This invention is concerned with a novel group of plastic compositions which possess remarkable qualities of strength and toughness, coupled with high flexibility and resiliency. These compositions are highly resistant to cutting and to abrasion as well as to attack by water, mineral acids, alkalies and oils. They have high dielectric strength and their essential qualities are retained throughout a wide range of temperatures. Thus, the new compositions are of marked value as electrical insulation.

Briefly described, these compositions are composed of certain types of vinyl resins modified by means of certain high-boiling softening agents or plasticizers, all as more fully hereinafter set forth.

The vinyl resins with which this invention is concerned are of the general class described in E. W. Reid Patent 1,935,577, and which may result from the conjoint polymerization of a vinyl halide with a vinyl ester of a lower aliphatic acid. Within this class, the invention specifically is limited to those resins which contain from about 85% to about 95% by weight of combined vinyl halide and which have an average molecular weight above about 18,000. While such resins may be formed by the conjoint polymerization of vinyl halides generally with such vinyl esters of aliphatic acids as those of acetic, propionic, butyric, and like acids, the resins which result from the conjoint polymerization of vinyl chloride with vinyl acetate are preferred. These resins may be made by various known processes, such as those of my Patent 2,055,468 or E. W. Reid Patent 2,064,565. Since the usual result of the initial polymerization process is a resin composed of a mixture of polymeric aggregates of various sizes, it may be necessary, in some cases, to treat the initially formed product to separate those polymers having the high average molecular weight required for the purposes of this invention. This may be done according to the methods of Young and Douglas Patent 1,990,685, or by means of other known methods of extraction or fractional dissolution and precipitation. Molecular weights referred to herein are those calculated by means of Staudinger's formula from determinations of the specific viscosity of dilute solutions of the resins. Such a determination may be carried out by dissolving a 0.100 gram sample of the resin in 50 cc. of nitrobenzene. The solution is then kept at 20° C. for at least twelve hours, and its viscosity measured in seconds in an Ostwald viscosimeter at 20° C. The viscosity of the nitrobenzene at this temperature is also measured. The average molecular weight is then calculated according to Staudinger's formula:

$$Nsp = CK_m M$$

where $Nsp$ = specific viscosity $$\left(\text{specific viscosity} = \frac{\text{viscosity of resin solution}}{\text{viscosity of solvent}} - 1\right)$$

C = concentration, primary moles per liter
$K_m$ = a constant = $3.4 \times 10^{-4}$
M = molecular weight This formula and its basis are discussed in "Hochmolekulare Organische Verbindungen" by Staudinger (1932), and the evaluation of the constant, $K_m$, for use with the resins to which this invention is directed is reported by Douglas and Stoops in Ind. & Eng. Chem., vol. 28, page 1152 (1936). "Primary mols" refers to the molecular weight of the recurring unit in the polymeric aggregate of the resin.

In the past it has been proposed to make flexible and resilient plastic compositions from various vinyl resins, and these have found wide use in electrical insulation. For example, polymerized vinyl chloride can be combined with plasticizers to form a rubbery composition of considerable value. It has also been proposed to use certain conjoint polymers of vinyl halides with vinyl esters of aliphatic acids in similar compositions, such as those described in Groff Patent 1,966,856. The plastic compositions of the present invention differ from and represent material improvements over these previously known related compositions.

A greater variety of plasticizers may be used with the resins from which the present compositions are formed, than is possible in the case of polyvinyl chloride; and, at the same time, in accordance with this invention, less plasticizer or softening agent is required to produce compositions which have adequate resiliency and flexibility, and the resulting compositions have greater strength and toughness. The characteristic behavior towards plasticizers of the resins of this invention is believed to be the result of internal plasticization of the conjoint polymers by the vinyl esters of aliphatic acids combined therein. In order for the conjointly polymerized resins to exhibit this difference from polyvinyl chloride, it is necessary that the resins contain at least 5% by weight of combined aliphatic vinyl esters; since conjoint polymers which contain only small amounts, such as 1% to 2% by weight, of combined aliphatic vinyl esters are not significantly different from polyvinyl chloride itself. This reduction in the amount of plasticizer necessary to combine with the resins employed in this invention to yield resilient and flexible compositions also results in improved electrical properties when such products are used for electrical insulation, since most plasticizers have a high dielectric loss.

The physical operations of combining the resins of the present compositions with plasticizers to form a homogeneous product can be more easily and more economically carried out than is true in the case of polyvinyl chloride. Because resistance to oil is an essential quality for certain uses of compositions of these types, it is often desirable to use plasticizers which are not soluble in oil. Polyvinyl chloride suffers from the defect that it is not satisfactorily compatible with many of the available oil-insoluble plasticizers and does not form useful compositions with them. Opposed to this, the resins of the present compositions can be readily plasticized with a wide variety of oil-insoluble plasticizers.

This invention is quite closely related to previously known plasticized compositions made from resins of the conjoint polymer type, such, for example, as those described in Groff Patent 1,966,856. The present compositions are much stronger and tougher and possess far greater resistance to cutting and to abrasion and have other beneficial properties not found in these previously known compositions. This is due in a large part to the fact that the present compositions are formed from resins of high vinyl halide content and high average molecular weight. By comparison, the compositions described in Patent 1,966,856, whose molecular weights are identified in terms of their toluene-insolubility, have a molecular weight expressed on the basis used herein of about 8,000 to about 12,000.

The plastic compositions of this invention are resilient rubber-like gels and they are formed by intimately dispersing the resin, as described above, with an appropriate quantity of the plasticizer under the influence of heat or mechanical working or both. These compositions not only exhibit superior mechanical properties at ordinary temperatures, but they do not soften appreciably or become weak at somewhat elevated temperatures, for example, 80° C. The softening agents or plasticizers which can be used in forming the new compositions include a wide variety of high boiling materials, many of which are known and have been proposed for the same or for similar purposes in other compositions. A few examples of such agents are: dioctyl sebacate, trioctyl phosphate, di(chlorethoxy ethyl) phthalate, di(ethoxyethenoxy ethyl) phthalate, tricresyl phosphate, and the dioctoates of tritetra- or pentaethylene glycols (the octyl radicals referred to may be the normal octyl group or those of branched-chain isomers, such as the 2-ethyl hexyl group). Of the above group of plasticizers, those which are esters of aliphatic alcohols or acids are preferred, since it has been observed that this class produces plastic compositions having superior flexibility at low temperatures. The plasticizers may be used in amounts ranging from about 15% to about 60% by weight of the total resin and plasticizer, depending upon the degree of flexibility and other properties desired in the product. The compositions can be readily shaped and handled in the same manner as previously known compositions in the formation of insulated wire, cable, and many other articles in the electrical and related fields. An electrical conductor insulated with a composition of this invention is illustrated in the drawing. All of the compositions of this invention are characterized by high strength coupled with good flexibility, and by resistance to cutting and abrasion. In general, they have a tensile strength in excess of 3500 pounds per square inch with an elongation ranging from 200% to 400%, while their resistance to cutting as determined by an empirical test (to be described later) is greater than ten hours.

The preparation of resins for use in the invention will be illustrated by the first two of the following examples, and the remaining examples are directed to the plastic compositions:

EXAMPLE I

Ninety-two parts by weight of vinyl chloride, 8 parts by weight of vinyl acetate and 0.15 part by weight of diacetyl peroxide were heated with agitation at 30° to 32° C. in a steel autoclave for thirty-five hours. The resultant resin was separated from unreacted monomeric materials by drying it in a rotary vacuum drier. This resin was found to have an average molecular weight of 19,000, as determined by the Staudinger method using an Ostwald viscosimeter. On analysis it was found to contain 95% by weight of combined vinyl chloride.

EXAMPLE II

Sixty-eight parts by weight of vinyl chloride, 17 parts by weight of vinyl acetate, 15 parts by weight of acetone, and 0.15 part by weight of diacetyl peroxide were heated with agitation at 32° C. in a lead-lined autoclave for ninety hours. The resultant resin was separated from the solvent and from unreacted monomeric materials by subjecting the solution obtained from the autoclave to a spray-drying process. This resin, as made, had an average molecular weight of 14,000, as determined by the Staudinger method using an Ostwald viscosimeter. On analysis it was found to contain 89% by weight of combined vinyl chloride.

In order to increase the average molecular weight of this resin to the high values required for the present invention, the lower polymers were removed from it by a fractional precipitation procedure. In this part of the process, the resin was dissolved in acetone using 165 parts by weight of acetone for each 20 parts by weight of the resin. The mixture was heated to 45° C., and the resin was fractionally precipitated by adding a mixture of 80 parts by weight of acetone and 20 parts by weight of water (i. e., sufficient to give a 5% concentration of water in the total liquids present). A portion of the resin precipitated from the solution, and, after the precipitate had settled, the supernatant liquid was decanted. The precipitate, which was the material of high molecular weight, was then redissolved in acetone and completely precipitated by the addition of isopropyl alcohol. The granular precipitate thus formed was washed with water to remove any residual solvents, centrifuged, and dried in a rotary dryer. This product had an average molecular weight of 20,000 and it analyzed 89.5% by weight of combined vinyl chloride.

EXAMPLE III

The purpose of this example is to describe plasticized, rubber-like compositions made from the high molecular weight resins of this invention and to compare their properties with those of similar products prepared from the best commercial grade of polyvinyl chloride, which has an average molecular weight of about 17,000 to 18,000, as determined by the viscosity method discussed previously.

To this end, two resins representative of those of this invention were compounded with several plasticizers, the amount of the plasticizer incorporated in each case being that required to produce flexibility at temperatures as low as about −17° C. in a sheet 0.060 of an inch thick. The plasticizers selected were those characterized by their particular ability to impart flexibility at low temperatures to the resins of this invention, possibly by virtue of the aliphatic groups which they contained. However, the same plasticizers, which were esters of aliphatic alcohols or acids (that is, esters containing at least one aliphatic radical), were not satisfactorily compatible with the commercial grade of polyvinyl chloride and attempts to incorporate them in this resin did not result in tough, abrasion resistant compositions suitable for electrical insulation. Accordingly, this resin was compounded with one of the best plasticizers known for it at the present time, namely tricresyl phosphate. In every instance the plasticizers were incorporated in the resins by thorough mixing of the ingredient on a heated roll mill. The results of the comparative tests are tabulated below.

tained from plasticized compositions of this invention are influenced by the plasticizer selected is shown by the following table. However, those plasticizers which are able to plasticize the high molecular weight resins of this invention so effectively, are not satisfactorily compatible with the commercial grade of polyvinyl chloride.

Table B

| Plasticizer | Per cent by weight of total composition required for flexibility at −17° C. with— | | Cutting time at 80° C. (hours) | |
|---|---|---|---|---|
| | Resin No. 1 | Resin No. 2 | Resin No. 1 | Resin No. 2 |
| Dioctyl sebacate | 26 | 26 | Over 16 | Over 16 |
| Trioctyl phosphate | 28 | 28 | Over 16 | Over 16 |
| Di(diethylene glycol monoethyl ether) phthalate | 32 | 32 | 0.03 | Over 16 |
| Tricresyl phosphate | 40 | 40 | 0.01 | Over 16 |

Resin No. 1 and Resin No. 2 were the same as those identified in Table A.

The cutting test is of value in determining the suitability of the material for insulating wire. The test is conducted by supporting a strip of the composition 0.060 inch thick, 0.25 inch wide and 4 inches long on a 20 gauge wire over which is looped a wire 0.010 inch in diameter, from the Table A

| Resin No. | Amount of plasticizer (per cent by weight of total mix) | Tensile strength at 85° F. (lb. per sq. in.)[1] | Elongation (per cent) at 85° F.[1] | Cutting time at 80° C. (hours)[1] |
|---|---|---|---|---|
| 1. Vinyl chloride and vinyl acetate conjoint polymer, 90% combined vinyl chloride, mol. wt. 21,000 | [2] 26 | 3,910 | 270 | Over 16 |
| 2. Vinyl chloride and vinyl acetate conjoint polymer, 95% combined vinyl chloride, mol. wt. 21,000 | [2] 26 | 4,100 | 270 | Over 16 |
| 3. Polyvinyl chloride, mol. wt. 18,000 | [3] 40 | 2,800 | 275 | Over 16 |

[1] Test methods described at end of example.
[2] Triethylene glycol di(2-ethyl hexoate).
[3] Tricresyl phosphate.

The significance of these test values is that, in order to obtain adequate flexibility at low temperatures and sufficient resilience and elasticity at ordinary temperatures in plasticized polyvinyl chloride, it is necessary that it contain as much as 40% by weight of one of the plasticizers most compatible with it. On the other hand, as little as 26% by weight of one of their most compatible plasticizers present in the plasticized resins of this invention suffice to secure these characteristics. As a consequence, it is possible to obtain from the latter resins, products having rubber-like properties equal to that of plasticized polyvinyl chloride but with greatly increased strength and toughness. In other words, with the new resins, to obtain flexible, rubber-like products, it is not necessary to add so great an amount of plasticizer that the strength of the product is materially reduced and its electrical properties impaired.

It is thus possible to produce plastic compositions of decided value by incorporating the plasticizer with the resins in amounts ranging from about 15% to about 40% by weight of the total resin and plasticizer, although more plasticizer may be added to increase the flexibility. This, however, reduces the tensile strength.

That the properties of the rubber-like gel obends of which is suspended a 1,000 gram weight. The test is conducted at a constant temperature of 80° C., and the resistance to cutting is measured in the terms of the time required for the weighted wire to cut through the test strip.

The tensile strength and elongation of the new plastic compositions are significant in that they determine whether the product is of adequate strength and flexibility for electrical insulation. This test is carried out by molding a specimen cut from the milled composition into a sheet. Standard dumb-bell shaped test pieces are stamped from this sheet with a die and their tensile strength and elongation measured by means of a Scott rubber testing machine.

*Example IV*

This example points out the significance of the limitations as to molecular weight and combined vinyl halide imposed on the resins used in the plastic compositions of this invention. To show this, a series of resins of varying molecular weight and combined vinyl chloride content were compounded with about 26%, by weight of the total composition, of a plasticizer, triethylene glycol di(2-ethyl hexoate). The tensile strength and resistance to cutting of these resins is tabulated below.

| Molecular weight | Combined vinyl chloride (per cent by weight) | Tensile strength (lb. per sq. in.) | Cutting time 80° C. |
|---|---|---|---|
| 10,000 | 86 | Below 1,000 | Below 1 min. |
| 14,000 | 87 | 2,480 | Below 1 min. |
| 16,000 | 89 | 3,400 | 10 M in. |
| 21,000 | 90 | 3,910 | Over 16 hrs. |
| 21,000 | 95 | 4,100 | Over 16 hrs. |
| 20,500 | 82 |  | 10 min. |

Inspection of these test values reveals that, if either the molecular weight is below 18,000, or if the combined vinyl chloride content is outside the range of 85% to 95% by weight, then the properties of the plastic composition needed for electrical insulation are damaged.

Modifications of the invention, other than as set forth in the examples, will occur to persons skilled in the art. These would include the use in the plastic compositions of pigments, such as carbon black and lead oxide, of heat and light stabilizers, such as lead or calcium stearate or oleate, and of various dyes, lubricants, fillers and other conventional ingredients. All such modifications are included in the scope of the invention as defined in the appended claims.

I claim:

1. A plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of a vinyl halide with a vinyl ester of a lower aliphatic acid, containing from about 85% to about 95% by weight of combined vinyl halide and having an average molecular weight above 18,000, intimately combined with a plasticizer in amounts ranging from about 15% to about 60% by weight of the total amount of said resin and said plasticizer; the amount of said combined vinyl halide in said resin, the average molecular weight and the amount of said plasticizer being correlated as defined by said values whereby said composition is flexible at temperatures as low as about −17° C. and relatively highly resistant to wire cutting at temperatures as high as about 80° C.

2. A plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of a vinyl halide with a vinyl ester of a lower aliphatic acid, containing from about 85% to about 95% by weight of combined vinyl halide and having an average molecular weight above 18,000, intimately combined with an ester, containing at least one aliphatic radical, as a plasticizer in amounts ranging from about 15% to about 40% by weight of the total amount of said resin and said plasticizer; the amount of said combined vinyl halide in said resin, the average molecular weight and the amount of said plasticizer being correlated as defined by said values whereby said composition is flexible at temperatures as low as about −17° C. and relatively highly resistant to wire cutting at temperatures as high as about 80° C.

3. A composition as claimed in claim 2 in which the plasticizer is dioctyl sebacate.

4. A composition as claimed in claim 2 in which the plasticizer is di(diethylene glycol monoethyl ether) phthalate.

5. A plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of vinyl chloride with vinyl acetate, containing from about 85% to about 95% by weight of combined vinyl chloride and having an average molecular weight above 18,000, intimately combined with a plasticizer in amounts from about 15% to about 60% by weight of the total amount of said resin and plasticizer; the amount of said combined vinyl chloride in said resin, the average molecular weight and the proportion of said plasticizer to said resin being correlated as defined by said values whereby said composition is flexible at temperatures as low as about −17° C. and relatively highly resistant to wire cutting at temperatures as high as about 80° C.

6. A plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of vinyl chloride with vinyl acetate, containing from about 85% to about 95% by weight of combined vinyl chloride and having an average molecular weight above 18,000, intimately combined with a plasticizer in amounts ranging from about 15% to about 40% by weight of the total amount of said resin and said plasticizer; the amount of said combined vinyl chloride in said resin, the average molecular weight and the amount of said plasticizer being correlated as defined by said values whereby said composition is flexible at temperatures as low as about −17° C. and relatively highly resistant to wire cutting at temperatures as high as about 80° C.

7. A conductor for electric current electrically insulated with a plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of a vinyl halide with a vinyl ester of a lower aliphatic acid, containing from about 85% to about 95% by weight of combined vinyl halide and having an average molecular weight above 18,000, intimately combined with a plasticizer in amounts ranging from about 15% to about 60% of the total amount of said resin and plasticizer; the amount of said combined vinyl halide in said resin, said average molecular weight and the proportion of said plasticizer to said resin being correlated as defined by said values whereby said composition is flexible at temperatures as low as about −17° C. and relatively highly resistant to wire cutting at temperatures as high as about 80° C.

8. An electrical conductor in wire form electrically insulated with a resilient plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of vinyl chloride with vinyl acetate, containing from about 85% to about 95% by weight of combined vinyl chloride and having an average molecular weight above 18,000, intimately combined with a plasticizer in amounts ranging from about 15% to about 60% of the total amount of said resin and said plasticizer; the amount of said combined vinyl chloride in said resin, the average molecular weight and the amount of said plasticizer being correlated as defined by said values whereby said composition is flexible at temperatures as low as about —17° C. and relatively highly resistant to wire cutting at temperatures as high as about 80° C.

9. A composition as claimed in claim 8 in which the plasticizer is tricresyl phosphate.

10. An electrical conductor in wire form electrically insulated with a resilient plastic composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of vinyl chloride with vinyl acetate, containing from about 85% to about 95% by weight of combined vinyl chloride and having an average molecular weight above 18,000, intimately combined with an ester, containing at least one aliphatic radical, as a plasticizer in amounts ranging from about 15% to about 40% of the total amount of said resin and said plasticizer; the amount of said combined vinyl chloride in said resin, the average molecular weight and the amount of said plasticizer being correlated as defined by said values whereby said composition is flexible at temperatures as low as about —17° C. and relatively highly resistant to wire cutting at temperatures as high as about 80° C.

11. Process for making a plastic composition comprising a conjoint polymer of vinyl chloride with vinyl acetate, containing from about 85% to about 95% by weight of combined vinyl chloride and having an average molecular weight above 18,000, combined with a plasticizer, which comprises intimately mixing said resin and said plasticizer, in the proportion of about 85 to 40 parts by weight of said resin to about 15 to 60 parts by weight of said plasticizer, at an elevated temperature to form a plastic composition, and thereafter cooling said composition, the amount of said combined vinyl chloride in said resin, the average molecular weight and the proportion of said plasticizer to said resin being correlated as defined by said values whereby said composition has over a wide range of temperatures high tensile strength and toughness coupled with flexibility, resiliency, high dielectric strength and resistance to cutting, abrasion and attack by water, mineral acids, alkalies and oils.

12. A plastic gel-like composition having over a wide range of temperatures high tensile strength and toughness coupled with flexibility, resiliency, high dielectric strength and resistance to cutting, abrasion and attack by water, mineral acids, alkalies and oils, said composition comprising a conjoint polymer of vinyl chloride with vinyl acetate containing about 95% by weight of combined vinyl chloride and having an average molecular weight above 20,000 intimately combined with a high-boiling ester of an octyl alcohol as a plasticizer in amounts ranging from about 26% to about 40% by weight of the total amount of said resin and said plasticizer; the amount of said combined vinyl chloride in said resin, the average molecular weight and the amount of said plasticizer being correlated as defined by said values whereby said composition is flexible at temperatures as low as about —17° C. and relatively highly resistant to wire cutting at temperatures as high as about 80° C.

STUART D. DOUGLAS.